July 3, 1945.  J. P. BAGAN  2,379,469
SPIRAL TILLER
Filed July 20, 1943   3 Sheets-Sheet 1

Inventor:
John P. Bagan
By Pierce & Scheffler
his Attorneys.

July 3, 1945.   J. P. BAGAN   2,379,469
SPIRAL TILLER
Filed July 20, 1943   3 Sheets-Sheet 2

Inventor:
John P. Bagan
by
Pierce &
Scheffler
his Attorneys.

Inventor:
John P. Bagan
By Pierce & Scheffler
his Attorneys.

Patented July 3, 1945

2,379,469

UNITED STATES PATENT OFFICE 2,379,469

SPIRAL TILLER

John Peter Bagan, Portland, Oreg., assignor of one-third to Anthony R. Wanezek, Marshfield, Oreg.

Application July 20, 1943, Serial No. 495,462

7 Claims. (Cl. 97—41)

This invention relates to the provision of a combination of a spiral tiller designed to resist the end thrust produced by the rotation of the spiral tiller blade in contact with the ground, with a tractor designed to move the tiller over the ground, to rotate the tiller blade and to lower and raise the tiller into and out of operative contact with the ground.

An object of the invention is to so balance the means for resisting the end thrust of the tiller blade as to prevent not only side movement of the tiller but also any tendency thereof to twist or deviate from straight forward movement.

These objects are accomplished by a combination of a special design of the frame of the tiller, the design and mounting of a disc wheel attached to the frame and extending to the rear of the tiller, the design of the tiller blade itself and the provision of a spring-cushioned shock-absorbing thrust rod between the front of the tiller and the tractor.

Details of the designs of the frame and tiller blade and of the design and mounting of the disc wheel and thrust rod will be described hereinafter in connection with the accompanying drawings which illustrate an embodiment of the invention.

Referring to the drawings—

Figure 1:
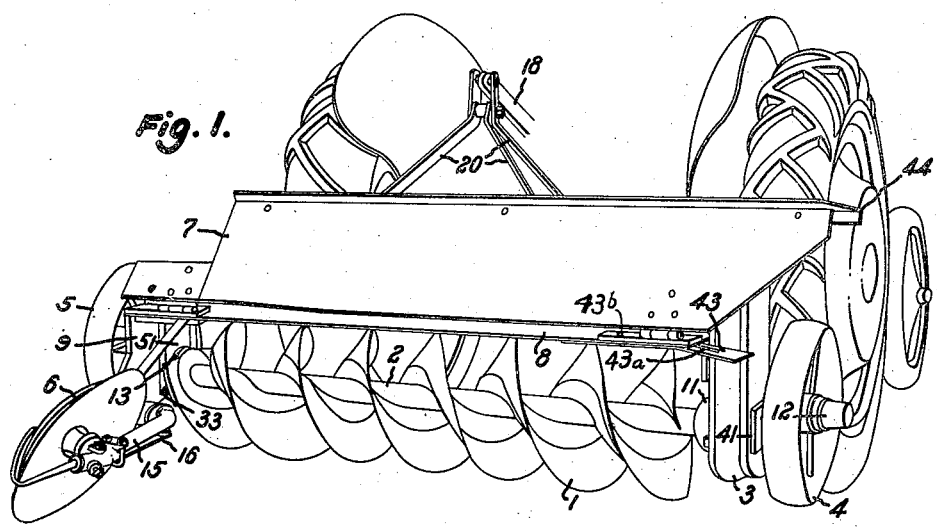
Fig. 1 is a rear perspective view of the tractor and tiller showing the spiral blade of the tiller and the end-thrust-resisting disc wheel.
Figure 3:
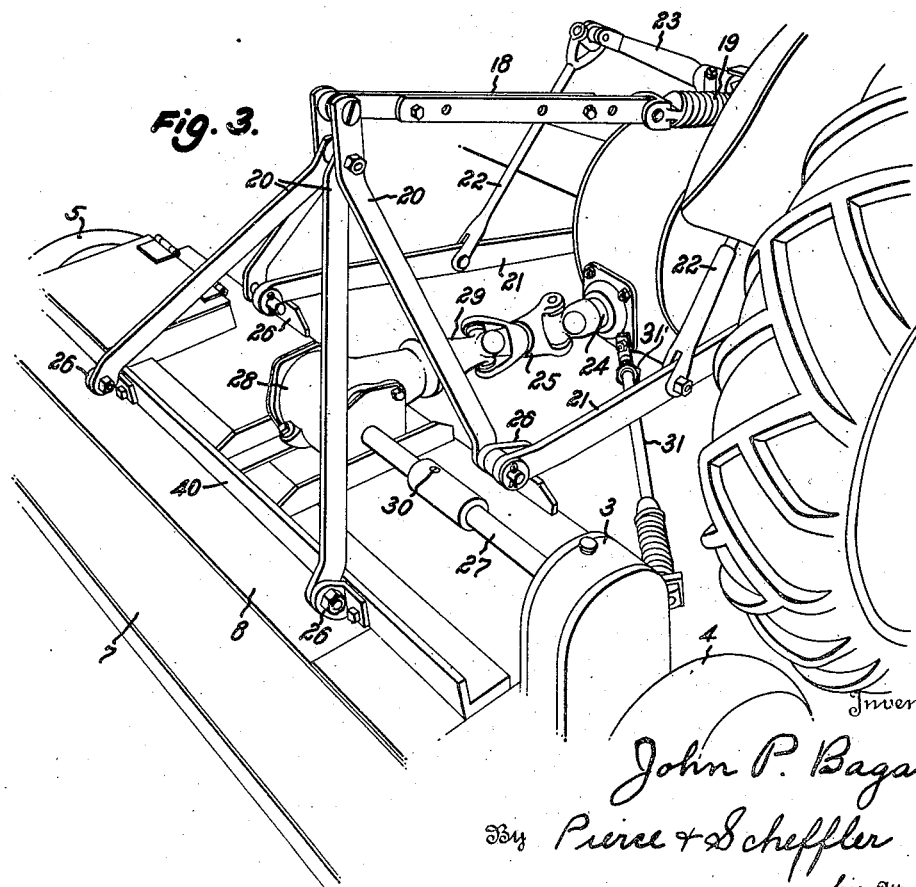
Fig. 3 is a perspective view looking downwardly into the connecting and operating mechanism between the tractor and tiller.

Referring to Fig. 1, it will be seen that the spiral blade I is mounted upon the central shaft 2. The blade may be of any of the designs illustrated in my prior copending applications Serial No. 400,949, filed July 3, 1941; Serial No. 395,635, filed May 28, 1941; and Serial No. 332,220, filed April 29, 1940. The preferred form of blade illustrated here is that in which it consists of an inner spiral portion extending outwardly or radially from the central shaft 2 perpendicular to the axis of the shaft and an outer spiral portion extending outwardly or radially from said inner portion at an angle to the axis of the shaft of say about 30° to 50°. The intersection of a plane through the axis of the shaft with the outer portion of the blade may be a straight line or more or less curved—that is, the outer portion of the blade may be simply a plane helical surface or more or less dished or curved.

The shaft is mounted in suitable bearings and is driven or rotated by any suitable means from the drive shaft of the tractor. In the form illustrated the right hand end of the shaft 2 carries a sprocket 46 which is driven by a drive chain 47 enclosed within the housing 3. Other features of the invention which appear in Fig. 1 are the vertically adjustable depth gauge wheels 4 and 5, the end-thrust-resisting disc wheel 6 and the soil baffle and levelling shield 7. As will be seen in Fig. 1, the tiller comprises a frame formed of the rigid horizontal platform 8 and the end plates 9 and 10. The right end bearing 11 for the shaft 2 is mounted on the housing 3 which in turn is mounted on the end plate 10 of the frame. The adjustable bearing 12 for the wheel 4 also is mounted on the housing 3. The bearing 13 for the left end of the tiller blade shaft 2 is mounted on the bearing plate 51 which is mounted on the end plate 9. The adjustable bearing 14 of the left wheel 5 is supported from the platform 8.

The disc wheel 6 is formed of a hub member 52 of substantial thickness capable of riding on the ground, to which is attached the relatively thin preferably concave member 53 which extends beyond the periphery of the member 52 to a distance of about 2 to 4 inches and provides a cutting edge which penetrates the untilled ground. The member 52 limits the penetration of the disc wheel into the ground.

The disc wheel 6 is adjustably mounted on the end plate 9 substantially at or slightly above the untilled ground level by means of the pivoted arm 15 which is spring pressed downwardly by the spring 16 but is free to pivot upwardly when the disc wheel strikes an obstruction, such as a stone. Its upward movement is not limited other than by the resistance of the spring and eventual contact with the baffle 7 or the frame platform 8. It will be seen that the wheel 4 rides in the old furrow, the wheel 5 rides on the untilled ground and the disc wheel 6 runs in the new furrow at the edge of the untilled ground and cuts to a substantial depth below the depth of the furrow.

Figure 2:
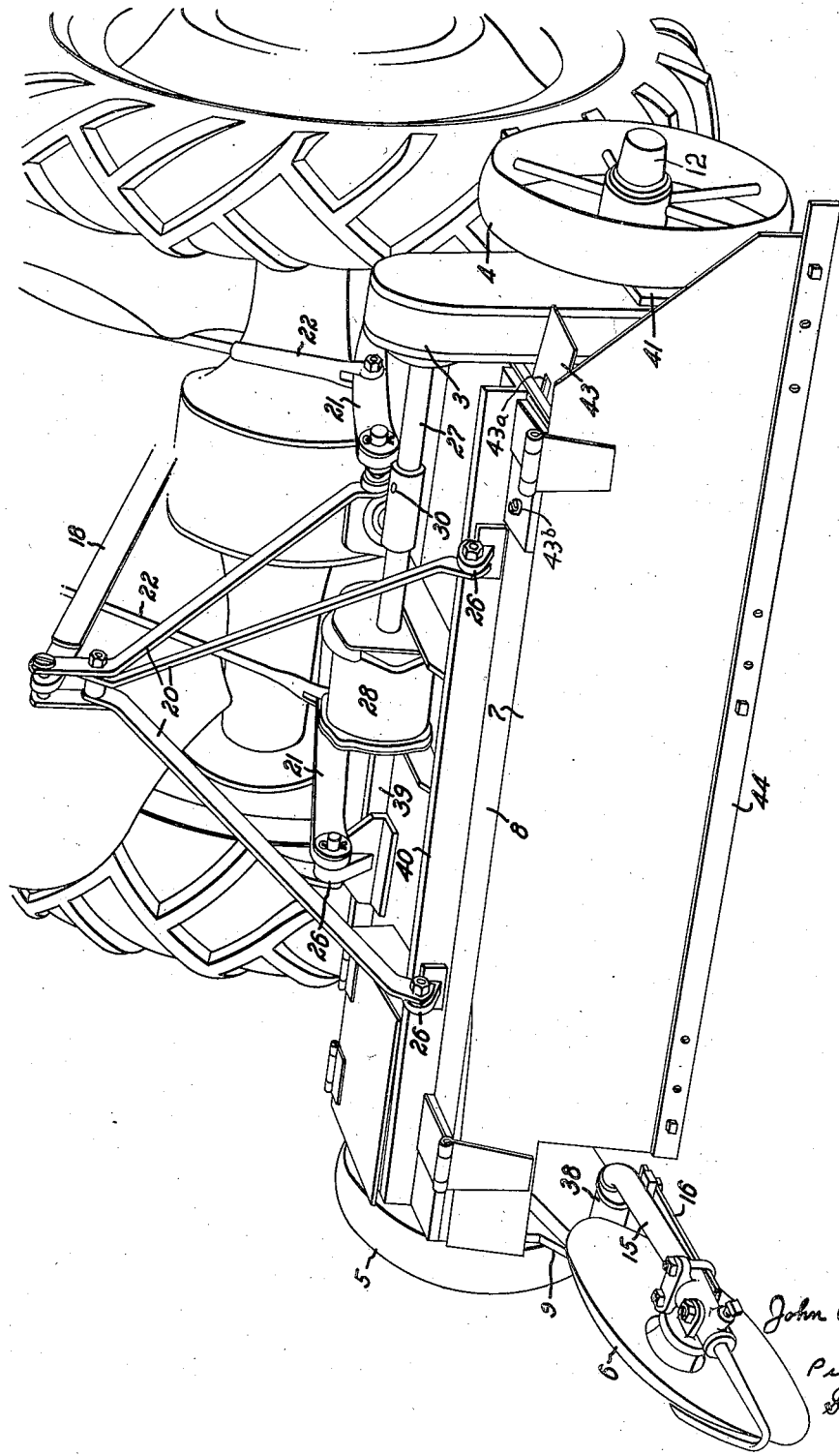
Fig. 2 is a rear perspective view of the tractor and tiller combination looking downwardly at an angle to reveal the connecting and operating mechanism.

The frame platform 8 carries, hinged thereto, the baffle and soil distributing plate or shield 7 which is shown in its elevated position in Fig. 1 to expose the spiral blade 1. It will be noted, however, that in its normal operating position illustrated in Fig. 2 is extends to the level of the tilled soil and serves to level and smooth the same. From Fig. 4 it will be seen that the frame of the machine also includes the downwardly extending front baffle 17 which serves to catch dirt thrown forwardly by the tiller blade. Attached to the right hand end of the platform 8 is the adjustable soil control damper 43 which may be adjusted by the slot and bolt connection 43a, 43b, respectively, as required to catch the dirt thrown by the tiller blade and drop it at the proper place so as to avoid any unevenness in the tilled soil distribution.

In Fig. 2 the baffle or shield 7 appears in its lowered or operative position and in this figure one sees also a part of the connection between the tractor and the tiller and also part of the drive mechanism. As is apparent, the tiller is closely coupled to the tractor. The tractor, which is not a part of the present invention, includes the bar 18 which is adjustable as to length, pivotally secured to the tractor chassis and spring cushioned by the spring 19. At its outer or free end the bar 18 carries the four depending hanger members 20. Levers 21 are pivoted at their front ends to the frame of the tractor and at their rear ends to the two forward hanger members 20. The levers 21 are connected through links 22 to the crane arms 23 which are raised and lowered by hydraulic mechanism (not shown) which forms a part of the tractor. The tractor also includes the stub shaft 24 driven by the engine of the tractor and adapted to be connected to and to drive any piece of machinery which may be attached to it. In adapting my spiral tiller to be carried and driven by the tractor, I have provided it with the lugs 26 for attachment to the member 20 and a drive shaft 27, gear box 28, drive shaft 29 and universal joints 25. One end of the shaft 27 extends into the housing 3 and carries a sprocket 48 which drives the chain 47 which in turn drives the sprocket 46 on the shaft 2. The other end of the shaft 27 extends into the gear box 28 and is connected through suitable gearing (not shown) to the shaft 29 which is driven by the shaft 24 through the universal joints 25. Shaft 27 is in two parts connected by the shear pin 30 to prevent breakage in the event that the tiller blade is stopped by some obstruction.

As has been indicated, the hydraulically operated crane mechanism and power drive shaft 24 are conventional parts of known tractors. The conventional combination of such tractors with soil cultivating tools, however, lacks any means for preventing or resisting the end thrust of my tiller. Neither the drive shaft 24 nor the supporting and lifting mechanism 18, 19, 20, 21, 22, 23, is adapted to resist end thrust. After extensive experimentation I have been able to provide balanced means for resisting the end thrust of the tiller comprising the disc wheel 6 above referred to and a spring cushioned shock absorbing thrust rod 31 adjustably connected at an angle of approximately 45° more or less in the direction of movement of the tractor and tiller between the front right hand end of the tiller frame and the middle portion of the axle housing of the tractor. Rod 31 includes a ball and socket joint 31' near the end attached to the tractor.

When it is considered that the spiral tiller blade rotates at a rate of from about 250 to 400 R. P. M. and is in engagement with the ground to a depth which may vary from say 2 inches to 13 inches or more, and that the tiller moves forward at a rate of from 2 to 6 miles per hour and that the ground varies in its resistance to movement by the tiller, it will be appreciated that the problem of keeping the tiller in alignment behind the tractor is a very serious one. The tiller blade, due to its spiral shape, tends to move laterally with respect to the ground with which it is in contact and this gives rise to a strong and somewhat variable end thrust, i. e. tendency to swing the rear end of the tiller at right angles to the path of the tractor.

The means for holding the tiller in its path against the action of this variable end thrust must, of course, be strong and durable but at the same time sufficiently flexible to avoid breakage and moreover simple and inexpensive and so designed as not to interfere with the operation of the tiller. As stated, I have found that the disc wheel 6 mounted to the rear of the tiller with its point of attachment to the tiller frame near ground level to run in the edge of the furrow produced by the tiller, together with the spring cushioned shock-absorbing thrust rod 31 which is positioned to resist both forward and lateral thrust at the opposite corner of the tiller frame adequately takes care of the tendency of the tiller to depart from the normal forward path of the tractor and tiller. It will be observed that the disc wheel 6 is spring mounted for vertical movement and that this spring mounting together with its ability to dig into the relatively soft ground adequately protects it against breakage due to lateral shocks. The rod 31 normally slopes downwardly from the tractor to the tiller at an angle to the horizontal of 10° to 30° and tends to resist upward movement of the tiller as well as lateral movement and its spring connection protects it against breakage due to shocks. Neither the disc wheel 6 nor the thrust rod 31, however, interfere with the normal vertical movement of the tiller when it is lowered or raised to its operative or rest positions. It will be appreciated that the tiller blade, due to the direction and speed of rotation, has a natural tendency to climb out of its furrow and to move forwardly toward the tractor. The rod 31 resists this forward movement as well as the end thrust.

Figure 4:
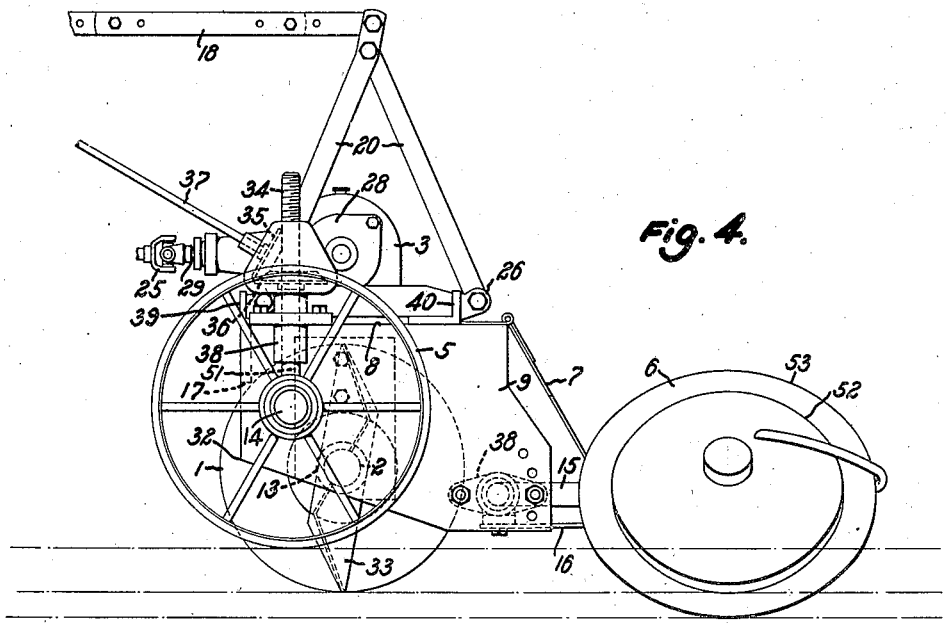
Fig. 4 is an end view of the left end of the tiller showing particularly the adjustable depth gauge wheel, the end cutter blade associated with the tiller blade, and the disc wheel.

By reference to Fig. 4 it will be seen that the left hand end of the machine as viewed from the rear is formed of the vertical end plate 9 which extends downwardly from the platform 8 of the frame. Plate 9 carries the bearing plate 51 the lower end of which carries the bearing 13 for the left hand end of the shaft 2. The leading edge of plate 9 is sharpened, as shown, at 32 to cut through any remaining shreds of sod left by the tiller blade and thus to give a smooth furrow edge. As will be seen also in Fig. 4, the end of the spiral cutter is provided with a flat member 33 which first of all serves to support the free ends of the spiral blade. Without this, the ends of the blade would be bent by striking obstructions in the ground, such as stones, roots, etc. The leading edges of member 33 are sharpened to cut the edge of the furrow and thus to facilitate the penetration of the tiller into the ground, especially at the end adjacent the untilled ground. The shape of the member 33 has been found to be very important. It must not close or obstruct the end of the spiral and cause dirt to accumulate therein and interfere with the operation of the tiller. On the other hand, the member 33 must not be too thick or it will not cut into the ground and it must be wide enough to give it the necessary strength to support the ends of the tiller blades. After extensive experimentation I have arrived at the shape and relative size of the member 33 as illustrated which I have found to be highly satisfactory, i. e. metal plate of from about ⅛ to ¼ inch thickness and varying in width from about 2 to about 6 inches with variations in the diameter of the spiral tiller from about 6 to about 20 inches.

Fig. 4 also illustrates the adjustable mounting of the wheel 5. Wheel 5 requires frequent and ready adjustment depending upon the hardness of the ground being worked and the depth at which the tiller is operating, and I have therefore provided to support the wheel 5 at the lower end of the shaft 34 and to adjust the shaft 34 vertically by means of the gears 35 and 36 and the crank 37 operable from the driver's seat. As will be seen further from Fig. 4, the disc wheel 6 is carried by the arm 15, one end of which forms the shaft for the wheel and the other end of which is mounted to pivot in the socket bearing 38 carried on the end plate 9.

Figure 5:
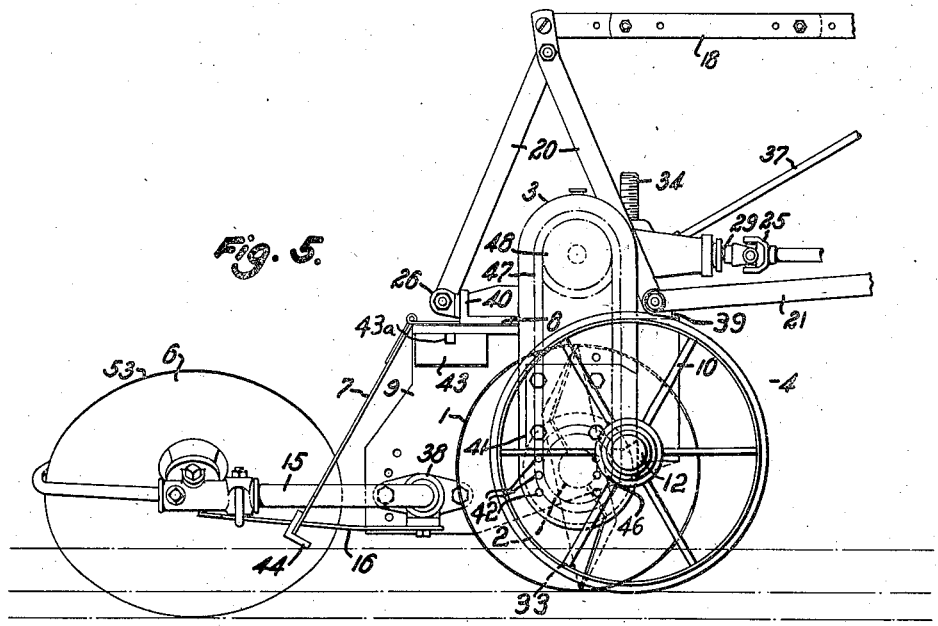
Fig. 5 is an end view of the right end of the tiller showing particularly the adjustable depth gauge wheel for that end of the tiller.

Referring to Figs. 4 and 5, I have shown the two angle irons 39 and 40 which serve to stiffen or reinforce the platform 8 of the machine. The downwardly extending edge of the angle iron 39 serves as the front baffle plate 17 to stop dirt which is thrown upwardly and forwardly by the tiller. The wheel 4 requires but little vertical adjustment and I have therefore shown its bearing 12 carried by the plate 41 which is bolted to the housing 3 and is adjustable vertically by means of a series of holes 42. It will be noted that the plate 7 carries the levelling bar 44 which is adjustable laterally as appears also in Figs. 1 and 2.

I claim:

1. In combination, a rotary spiral tiller having a spiral blade mounted for rotation on a substantially horizontal axis in a supporting structure carried on wheels, means carried by said structure for transmitting rotary motion to said spiral blade, a disc wheel mounted rearwardly and at one end of said structure to ride in the edge of the furrow produced by said tiller blade to resist the end thrust of said tiller blade, a tractor having supporting means for attachment to said structure and a drive shaft for connection to the means on said structure for rotating said spiral blade, and a spring cushioned shock-absorbing thrust rod attached to said tractor and structure and extending at an angle to the path of the tractor from the tractor to a point adjacent the end of said structure opposite that at which said disc wheel is attached.

2. The combination as defined in claim 1 in which the disc wheel comprises a relatively thick central portion adapted to ride on the surface of the ground and a relatively thin edge portion adapted to cut into the ground under the weight of the wheel and the added spring tension.

3. The combination as defined in claim 1 in which the disc wheel is pivoted about a point at or slightly above the surface of the ground being tilled, said pivot point being a short distance to the rear of the tiller blade.

4. The combination as defined in claim 1 in which the spring cushioned shock-absorbing thrust rod is pivoted to the tractor and slants downwardly toward the tiller when the latter is in operative position and makes an angle with the path of the tractor of about 45°.

5. The combination as defined in claim 1 in which the supporting structure comprises a rigid substantially horizontal platform, rigid downwardly extending end plates, a fixed and rigid downwardly extending baffle plate in front of the spiral cutter and a baffle plate hinged at its upper edge and extending downwardly and rearwardly to drag over the surface of the tilled ground and smooth the same.

6. A rotary tiller comprising a supporting structure, wheels movably supporting said structure, a spiral blade mounted on said supporting structure for rotation on a substantially horizontal axis, said supporting structure comprising a substantially horizontal platform positioned above said spiral blade and a laterally adjustable dirt damper carried by and extending laterally from the end of said platform adjacent the discharge end of said blade.

7. The combination as defined in claim 1 in which the disc wheel is carried by an arm pivoted to the supporting structure for upward swinging movement to substantially vertical position.

JOHN PETER BAGAN.